June 3, 1958 J. C. ARENTZ 2,836,971

FASHIONING MECHANISM FOR KNITTING MACHINES

Filed Dec. 17, 1956 9 Sheets-Sheet 1

INVENTOR.
John C. Arentz

BY Carl S. Olson

ATTORNEY.

June 3, 1958 J. C. ARENTZ 2,836,971

FASHIONING MECHANISM FOR KNITTING MACHINES

Filed Dec. 17, 1956 9 Sheets-Sheet 2

INVENTOR.
John C. Arentz

BY Earl S. Olson

ATTORNEY.

June 3, 1958 J. C. ARENTZ 2,836,971

FASHIONING MECHANISM FOR KNITTING MACHINES

Filed Dec. 17, 1956 9 Sheets-Sheet 3

INVENTOR.
John C. Arentz

BY Earl S. Olson

ATTORNEY.

FASHIONING MECHANISM FOR KNITTING MACHINES

Filed Dec. 17, 1956 9 Sheets-Sheet 4

INVENTOR.
John C. Arentz

BY Earl S. Olson

ATTORNEY.

INVENTOR.
John C. Arentz
BY Earl S. Olson
ATTORNEY.

FASHIONING MECHANISM FOR KNITTING MACHINES

Filed Dec. 17, 1956 9 Sheets-Sheet 6

INVENTOR.
John C. Arentz

BY Carl S. Olson

ATTORNEY.

June 3, 1958 J. C. ARENTZ 2,836,971

FASHIONING MECHANISM FOR KNITTING MACHINES

Filed Dec. 17, 1956 9 Sheets-Sheet 7

INVENTOR.
John C. Arentz

BY Carl S. Olson

ATTORNEY.

FASHIONING MECHANISM FOR KNITTING MACHINES

Filed Dec. 17, 1956 9 Sheets-Sheet 8

INVENTOR.
John C. Arentz

BY Earl S. Olson

ATTORNEY.

June 3, 1958 J. C. ARENTZ 2,836,971

FASHIONING MECHANISM FOR KNITTING MACHINES

Filed Dec. 17, 1956 9 Sheets-Sheet 9

INVENTOR.
John C. Arentz

BY Earl S. Olson

ATTORNEY.

United States Patent Office 2,836,971

Patented June 3, 1958

2,836,971

FASHIONING MECHANISM FOR KNITTING MACHINES

John C. Arentz, West Reading, Pa., assignor to Textile Machine Works, Wyomissing, Pa., a corporation of Pennsylvania Application December 17, 1956, Serial No. 628,847

14 Claims. (Cl. 66—89)

This invention relates to improvements in straight bar knitting machines and more particularly to mechanism for such machines for fashioning fabric blanks, for sweaters and other garments, having outer and inner shaped selvage edges.

In straight bar knitting machines of the type for knitting fashioned fabric blanks, particularly of the type for sweaters, the outer selvages of the blanks are fashioned by an outer set of point combs which are operated toward and away from each other. Such fabric blanks are also provided with neck portions having V-shaped inner selvages that are fashioned by an inner set of point combs which are also operated toward and away from each other. Usually the outer and inner selvages are fashioned at different rates so that the outer and inner sets of point combs must be operated and controlled independently of each other. When fashioning the outer selvages of the blanks the outer combs are first moved away from each other to widen the selvages and then are moved toward each other to narrow the selvages to provide for the attachment of the sleeves. The inner combs on the other hand are at their closest point of travel with the inner points of the combs aligned with next adjacent needles at the center of the blank for the start of the V-shaped selvages and are moved away from each other to narrow the selvages.

In the usual practice, the movement of one set of the outer combs for fashioning the left outer selvages of the blanks are controlled by a spindle mechanism at the left end of the machine and the set of combs for fashioning the right outer selvages are controlled from a like spindle mechanism at the right end of the machine. Both inner combs are usually controlled from a single spindle means located at a point intermediate the ends of the machine. Following the completion of each set of blanks, the several spindle mechanisms are manually operated to reset the combs to starting positions which increases the number of manual manipulations of the machine that must be performed to ready the machine for the start of each new set of blanks. This not only increases the production costs of the blanks but also contributes to the fatigue of the operator which decreases his operating efficiency.

It is an object of the invention to provide means in a straight knitting machine which permits a reduction in both the time and effort required for making the necessary adjustments to ready the machine for the start of a new set of blanks thereby increasing the productive efficiency of both the machine and the operator thereof.

Another object of the invention is to provide means in a straight knitting machine for automatically performing certain of the operations required to reset the fashioning mechanisms of the machine.

During the various fashioning and resetting operations of the combs, the inner combs closely approach each other and also at times closely approach the outer combs to a point where a missetting of the pattern means, controlling the operations of the combs, could cause accidental overtravel of the combs resulting in damage to the combs and the operating means therefor. Heretofore, safety means have been provided which acted to prevent such accidental engagement of the combs by stopping the machine or by preventing operation of the rotating means for the spindles. However, such safety means usually acted to prevent the rotating means from turning the spindles in either direction and manual manipulations were required to reset the combs and safety means before the rotating means could again be controlled to operate the spindles.

A further object of the invention is to provide means in a straight bar knitting machine for preventing overtravel of the combs in one direction by the operating means therefor without affecting the operating means for moving the combs in the opposite direction.

A still further object of the invention is to provide a unitary means in a straight bar knitting machine for controlling the limits of travel of an inner set of combs in a direction away from each other and of an outer set of combs in directions both toward and away from each other.

With these and other objects in view which will become apparent from the following description and the accompanying drawings, the invention resides in the novel elements, features of construction and arrangement of parts in cooperative relationship as hereinafter more particularly pointed out in the claims.

Figure 1:
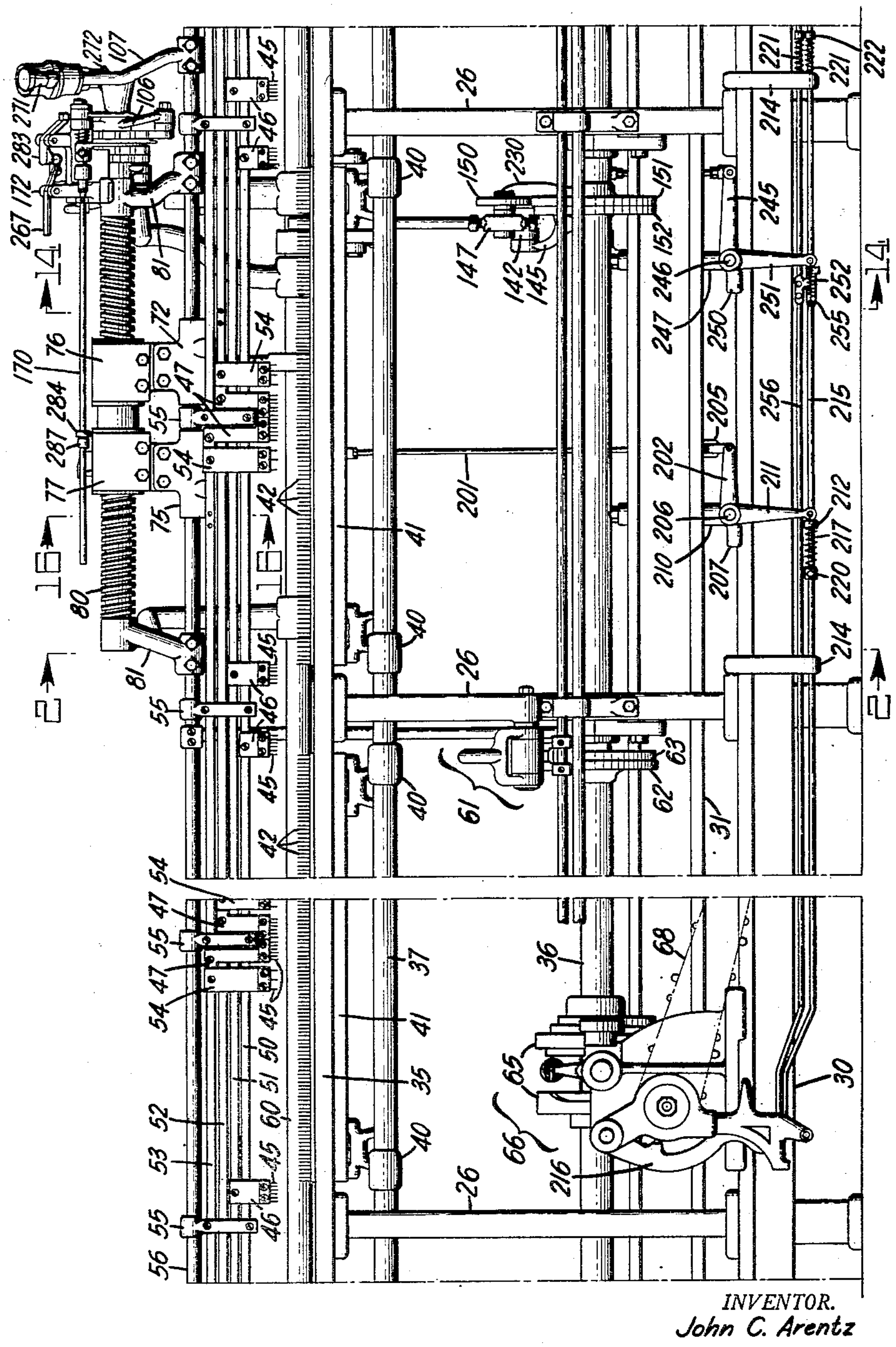
Figure 1 is a front elevational view of a portion of a multi-section full-fashioned knitting machine showing a spindle mechanism for operating an inner pair of fashioning combs and means according to the invention for controlling the spindle mechanism.

The mechanism shown in the drawings comprises portions of a full-fashioned knitting machine incorporating the novel features of the instant invention. The mechanism includes inner and outer sets of point combs for fashioning portions of knitted garments and separate spindle mechanism for controlling the movements of the combs. The mechanism also includes means for operating the inner point comb spindle to move the point combs in opposite directions to fashion inner selvage edges of fabric blanks and to idly reposition the point combs between fashioning operations. Also included is a safety means acting on the spindle operating means to prevent overtravel of the inner point combs toward each other without affecting the spindle operating means to move the inner combs away from each other. A safety means is also provided having a single member which is movable to engage a switch to stop the machine to prevent overtravel of the inner point combs away from each other and to prevent overtravel of the outer point combs in opposite directions.

Figure 2:
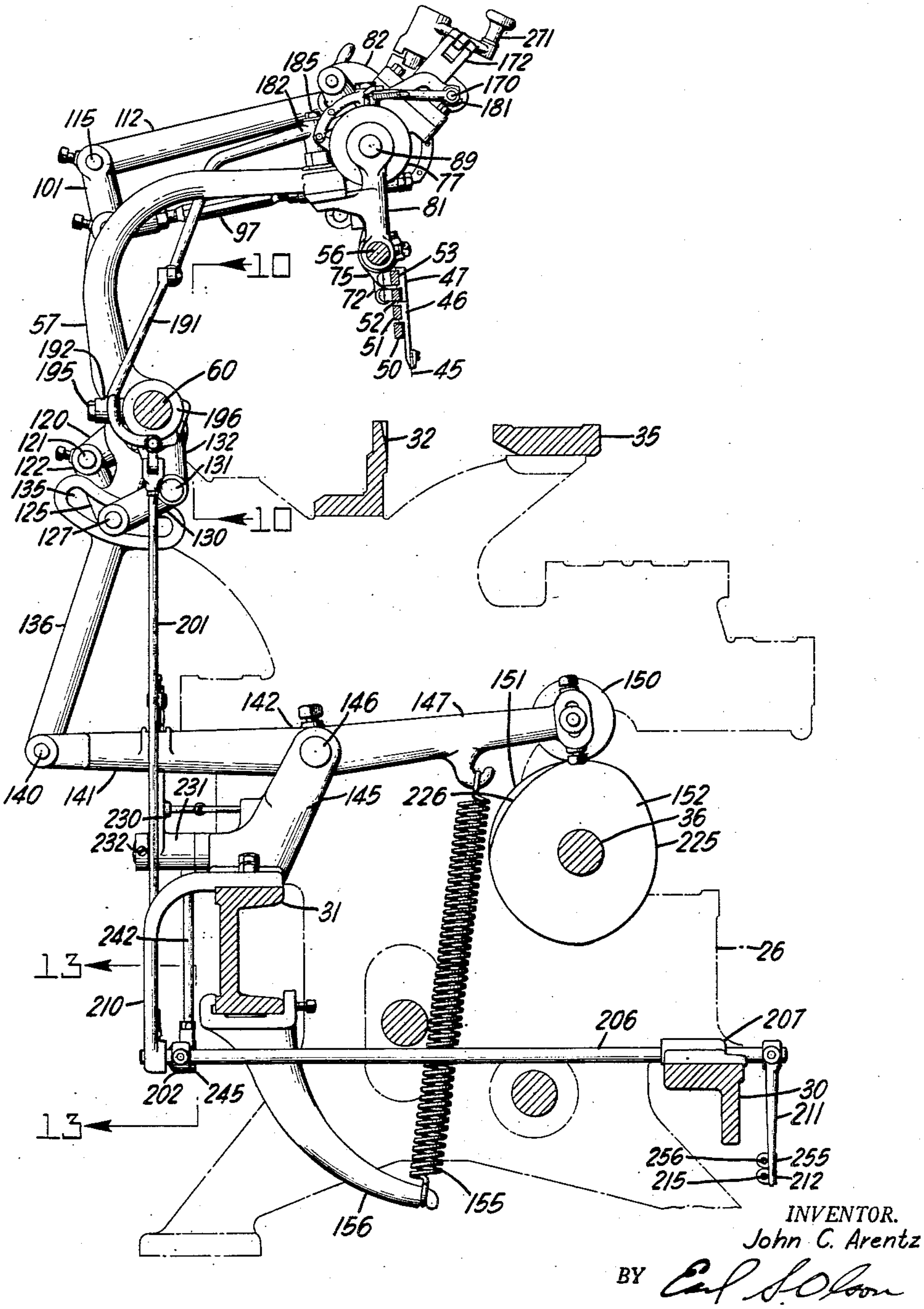
Fig. 2 is a cross-sectional view taken transversely through the machine looking in the direction of the arrows 2—2 on Fig. 1.
Figure 19:
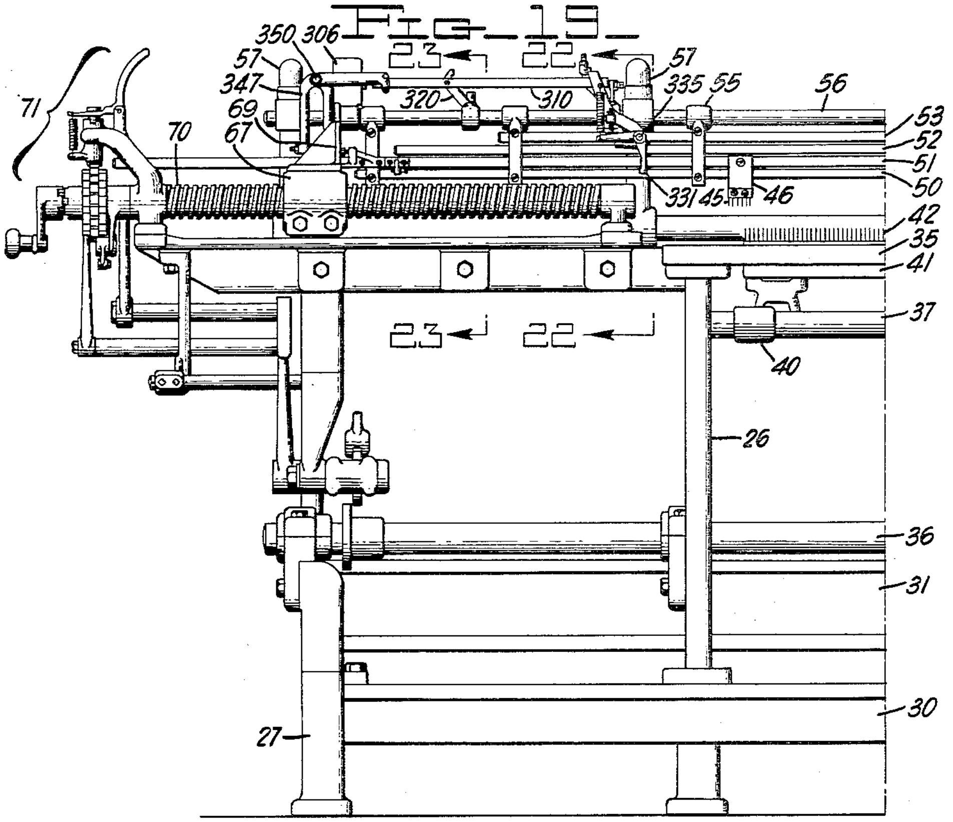
Fig. 19 is a front elevational view of the left end portion of the machine showing a spindle mechanism for operating the left outer fashioning combs and including certain of the safety mechanism according to the invention for preventing overtravel of the fashioning combs.

Referring to Figs. 1, 2 and 19 there is shown center and left end portions of a full-fashioned knitting machine of the type for forming outerwear fabric blanks such as for sweaters and the like, including transverse center frames 26, a left end frame 27, a front beam 30, a back beam 31, a center bed 32 and a front bed 35, the beams and beds being secured to the end and center frames to form the usual framework of the machine. Supported by the framework is a camshaft 36, and a needle bar shaft 37 having levers 40 supporting bars 41 each having a row of needles 42. The needle bars 41 are operated by cams (not shown) on the camshaft 36 to cause the needles 42, in conjunction with sinkers and dividers (not shown), to form yarns into loops of the fabric blanks. Cooperating with the needles 42 in each bar 41 to engage and transfer selvage loops to fashion the selvages of the fabric blanks are narrowing points 45 carried in right and left outer combs 46 and right and left inner combs 47, the points in the combs having the same spacing as the needles 42 in the needle bar 41. The right and left outer combs are mounted on narrowing rods 50 and 51, respectively, and the right and left inner combs are mounted on narrowing rods 52 and 53, respectively. As shown in Fig. 1 the rods 52 and 53 are also provided with additional combs 54 which are positioned on the rods closely adjacent to and outwardly of the combs 47. The combs 54 are provided with points 45 preferably having a spacing equal to two needles 42. The combs 54, although receiving the same movements as the combs 47 during fashioning movements of the latter as hereinafter set forth, act only to transfer loops to form lace openings inwardly of the loops in each of the fabric courses transferred by the combs 47.

The narrowing rods are moved to carry the outer and inner combs 46 and 47, respectively, toward and away from each other to fashion outer and inner selvage edges, respectively, of the fabric blanks. For this purpose the narrowing rods are slidably mounted in brackets 55 for movement along the row of needles 42, the brackets being secured to a front narrowing shaft 56 which is carried by arms 57 secured to a shaft 60 carried for rotative movement in the framework of the machine. The shaft 56 and associated combs 46 and 47 are supported in inactive position relative to the needles 42 during knitting cycles of the machine through a linkage 61 and a round disc 63 on the camshaft 36. During fashioning cycles of the machine the shaft 56 is moved along an arcuate path about the shaft 60 to lower and raise the points 45, and in cooperation with the movements of the needles 42, to engage and transfer the selvage loops to fashion the fabric blanks. This movement of shaft 56 is caused by engagement of the linkage 61 with a cam 62 on the camshaft 36, the latter being axially shiftable between knitting and narrowing positions to align either the disc 63 or cam 62 with the linkage. The axial shifting of the camshaft is performed by shifting cams 65 forming part of a usual pattern device 66 having a chain 68 (Fig. 1).

Figure 20:
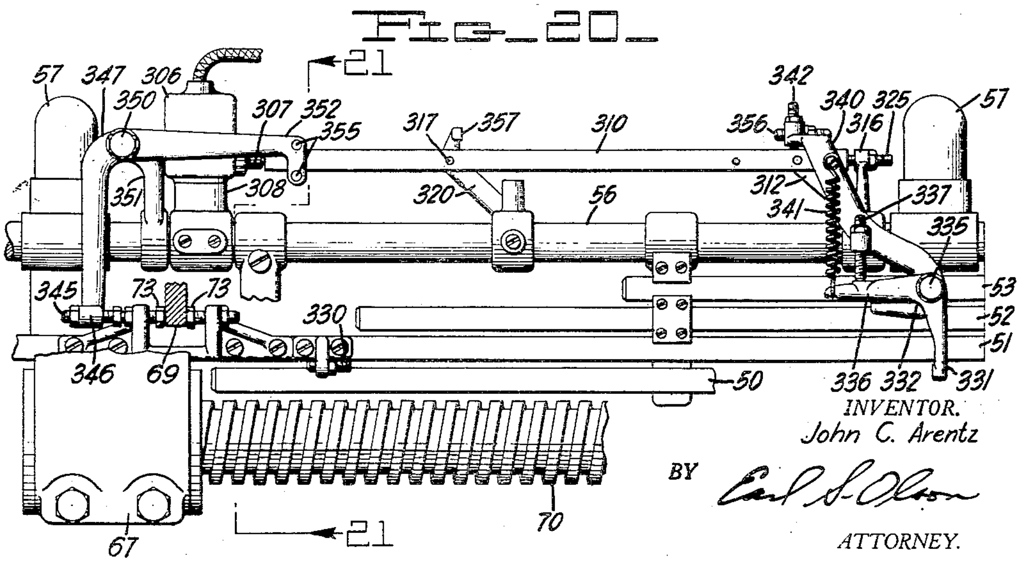
Fig. 20 is a view on an enlarged scale similar to a portion of the mechanism of Fig. 19, parts being broken away.

The rod 51 for the left outer combs 46 carries bolts 73 for engagement with opposite side faces of a portion 69 of a nut 67 mounted on a threaded spindle 70 for movement in opposite directions (Fig. 20). The spindle forms a part of a narrowing head mechanism 71 (Fig. 19) shown at the left end of the machine which may be similar in construction and operation to any one of the well known mechanisms for turning the spindle to move the combs in opposite directions. The rod 50 for the right outer combs 46 is moved in the same manner by a similar narrowing head mechanism at the right end of the machine (not shown).

Figure 3:
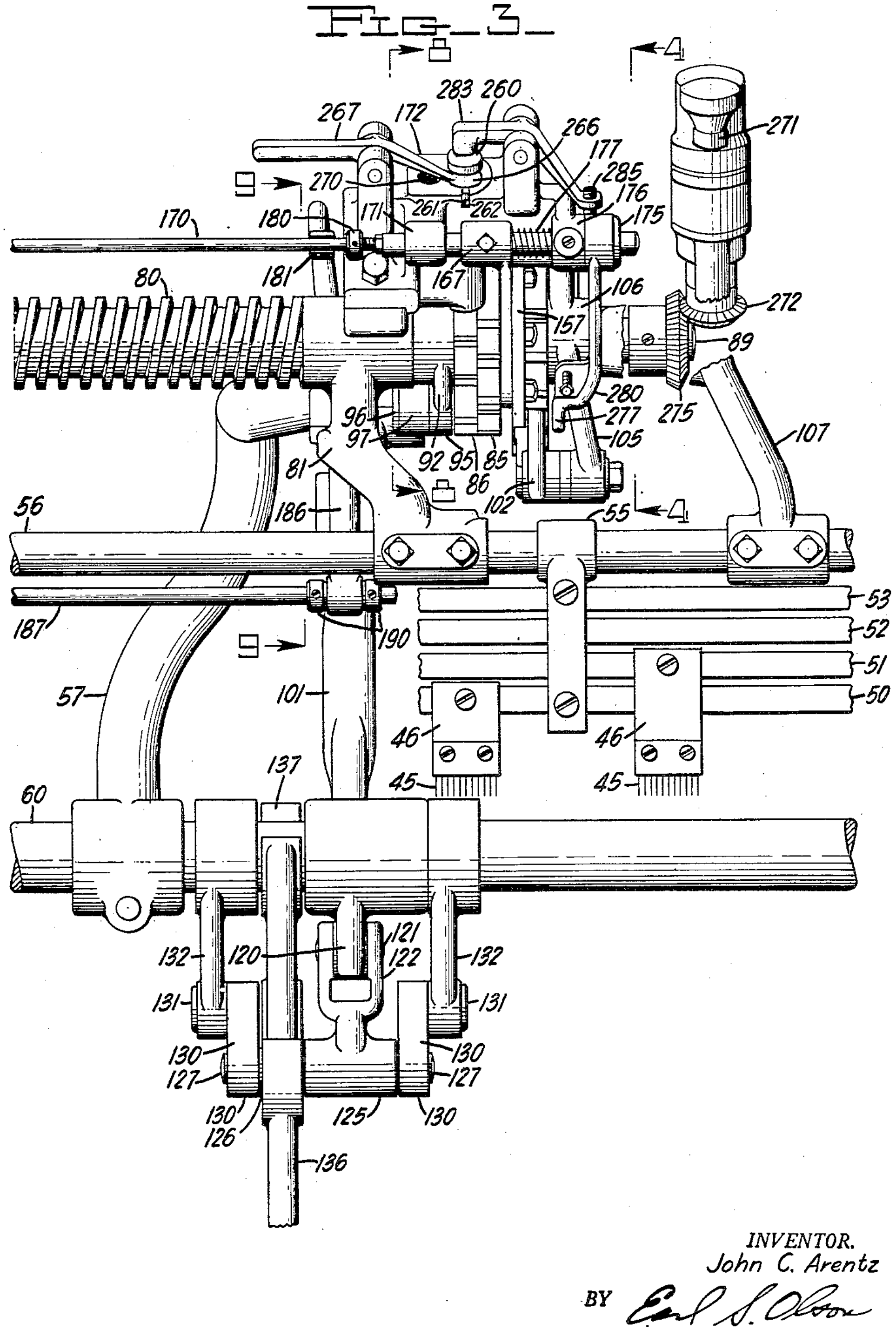
Fig. 3 is a view on an enlarged scale similar to a portion of the mechanism shown at the upper right hand of Fig. 1, parts being broken away in order to show other parts in the background.
Figures 4, 5, 6, 7, 8:
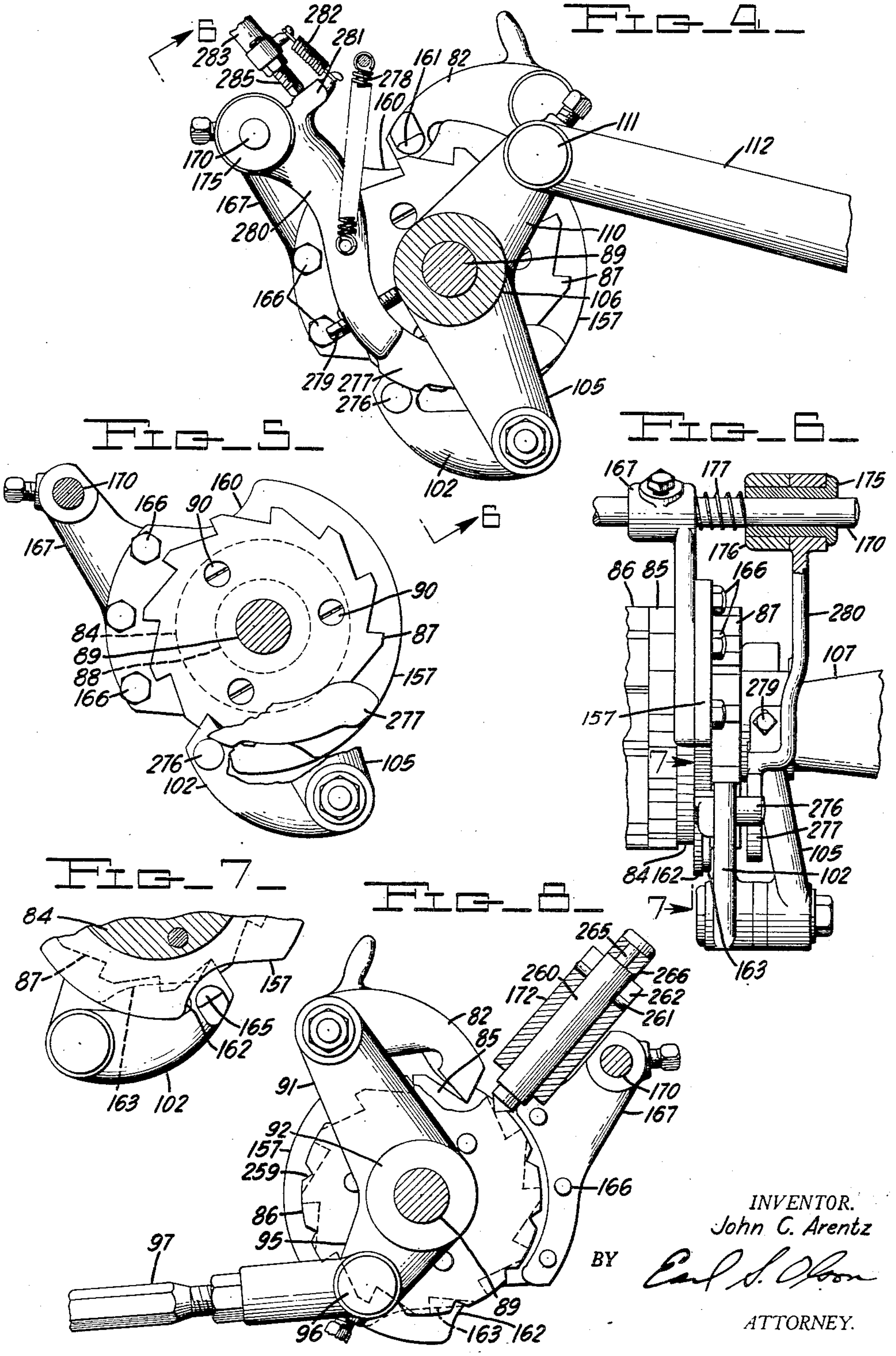
Fig. 4 is a view on an enlarged scale of a portion of the mechanism of Fig. 3, shown partly in elevation and partly in cross-section, taken in the direction of the arrows 4—4 on Fig. 3.
Fig. 5 is a view similar to Fig. 4 with parts being omitted and other parts being broken away.
Fig. 6 is an elevational view as seen in the direction of the arrows 6—6 of Fig. 4, parts being broken away and shown in cross-section.
Fig. 7 is a fragmentary view taken along the line 7—7 of Fig. 6.
Fig. 8 is a view taken substantially along the line 8—8 of Fig. 3, parts being broken away and shown in cross-section.
Figure 14:
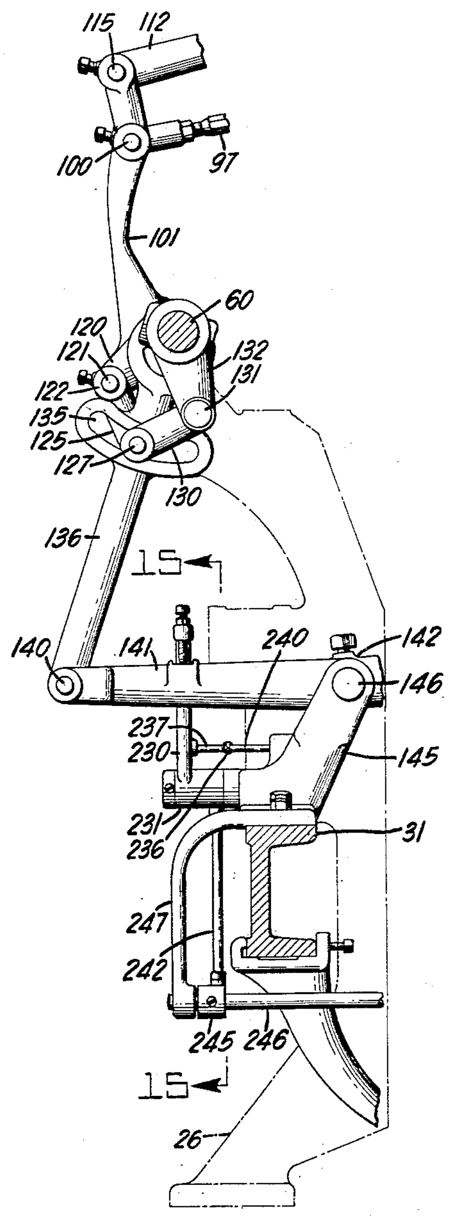
Fig. 14 is a detailed view on an enlarged scale partly in cross-section and partly in elevation taken substantially along the line 14—14 of Fig. 1, parts being omitted.
Figures 16, 17, 18:
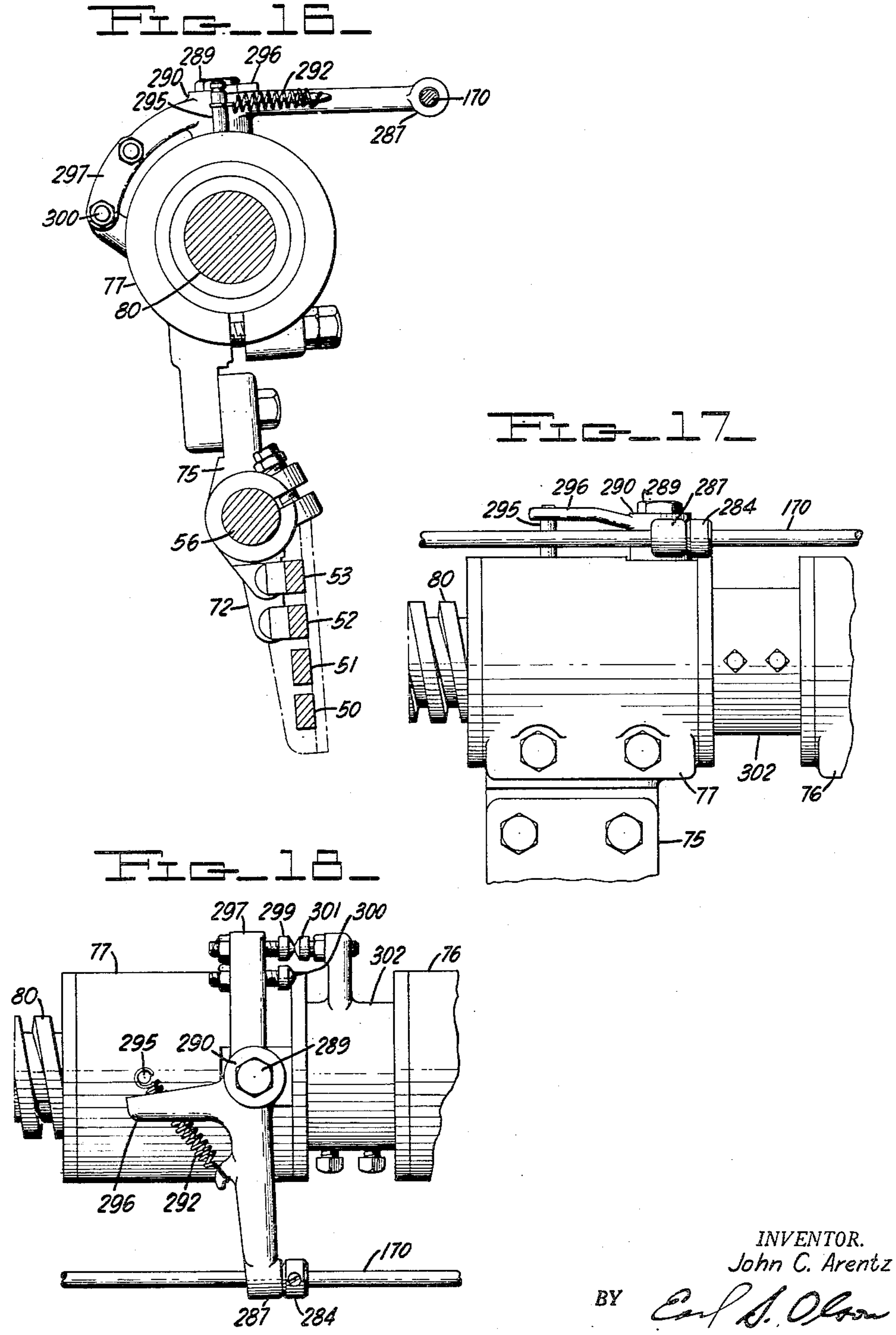
Fig. 16 is a view on an enlarged scale, partly in end elevation and partly in cross-section and taken along the line 16—16 of Fig. 1.
Fig. 17 is an elevational view as seen from the right of Fig. 16.
Fig. 18 is a plan view of the mechanism shown in Fig. 17.

The rods 52 and 53 are moved to carry the right and left inner combs 47 and the combs 54 associated therewith in opposite directions independently of the rods for the outer combs 46. To accomplish this movement the rods 52 and 53 are connected to brackets 72 and 75, respectively, which are slidably carried on the front narrowing shaft 56 (Figs. 1, 2 and 16). The brackets 72 and 75 are secured to nuts 76 and 77, respectively, which are mounted on reversely threaded portions of a spindle 80 having opposite end portions 89 of reduced diameter which are carried for rotative movement in bearing portions of arms 81 fixed on the shaft 56. The spindle 80 is rotated in a clockwise direction, as viewed in Fig. 8, and in a counterclockwise direction as viewed in Fig. 4 to move the nuts 76 and 77 and combs 47 associated therewith away from each other by a pawl 82 which is adapted to engage the teeth of a ratchet wheel 85. The ratchet wheel 85 is spaced from a second ratchet wheel 87 by a collar 84 and the ratchet wheels and collar are carried on a hub portion 88 of a notched disc 86 (Figs. 5 and 6). The ratchet wheels, notched disc and collar are secured to each other by bolts 90 (Figs. 5) and the disc is carried on and secured to the right end portion 89 of the spindle 80 to turn therewith. The pawl 82 is mounted on one arm 91 of a lever 92 pivotally mounted on the end portion 89 between the right hand arm 81 and the notched disc 86, as shown in Fig. 3. The lever 92 is provided with a second arm 95 which is pivotally connected by a pin or stud 96 to one end of a link 97 the other end of which is pivotally connected by a pin 100 to a lever 101 pivotally carried on the shaft 60 (Fig. 14).

The spindle 80 is rotated in the clockwise direction as viewed in Figs. 4 and 5 to move the nuts 76 and 77 and combs 47 and 54 associated therewith toward each other by a pawl 102 which is controlled to engage the teeth of and turn the ratchet wheel 87. The pawl 102 is carried on one arm 105 of a lever 106 rotatably mounted on the right end portion 89 of the spindle between the ratchet wheel 87 and a bearing portion of a bracket 107 secured to the shaft 56, the bearing portion also cooperating with an arm 81 to support the right end portion 89 of the spindle (Figs. 3 and 6). The lever 106 has a second arm 110 which is pivotally connected by a stud 111 to one end of a link 112 (Fig. 4), the other end of the link 112 being pivotally connected by a pin 115 to the lever 101 (Fig. 14).

The lever 101 is adapted to be oscillated about the shaft 60 to operate the pawl 82 or the pawl 102 to turn the spindle 80 in either direction to move the combs 47 away from or toward each other, as previously set forth. For this purpose, the lever 101 is provided with an arm 120 which is pivotally connected by a pin 121 to the forked end 122 of a link 125 (Figs. 3 and 14). The other end of the link 125 carries a shaft or pin 126 which has reduced end portions 127 each of which pivotally carries one end of a link 130. The other end of each link 130 is pivotally connected by a stud 131 to the free end of an arm 132 pivotally carried on the shaft 60. The shaft 126 passes through and is guided in an arcuate slot 135 (Fig. 14) formed in a lever 136 having a forked end 137 which is adapted to engage and be guided by the shaft 60. The lever 136 is connected by a pin 140 to one arm 141 of a lever 142 pivotally mounted on a bracket 145 by means of a pin or shaft 146. The lever 142 has a second arm 147 (Fig. 2) which carries a roller type follower 150 for engagement with cams 151 and 152 on the camshaft 36. As shown in Fig. 1, the follower 150 is positioned to engage the cam 151 during the knitting position of the camshaft 36 and to engage the cam 152 when the camshaft is shifted to narrowing position as hereinbefore set forth. A spring 155 connected between the arm 147 and a bracket 156 carried on the back beam 31 (Fig. 2) biases the lever 142 toward the cams.

Selective engagement of the pawls 82 and 102 with the ratchet wheels 85 and 87, respectively, is controlled by a cam disc 157 which is non-rotatably mounted on but slidable axially along the collar 84 between the ratchet wheels 85 and 87 (Figs. 3 and 6). The cam disc 157 has an upper recess 160 (Figs. 4 and 5) adapted in one position of disc 157 on collar 84 to receive a projection 161 on the pawl 82, the wall of the recess serving as a cam to lift the pawl out of engagement with the teeth of the ratchet wheel 85 during operation of spindle 80 by the pawl 102. The cam disc is also provided with a lower recess 162 which is adapted in a second position of disc 157 on collar 84 to receive a projection 165 on the pawl 102 (Fig. 7) the wall of the recess serving as a cam to disengage the pawl from the teeth of the ratchet wheel 87 during operation of the spindle 80 by the pawl 82. The cam disc also has a recess 163 of only one-half the width of the edge face of the disc, the wall of recess 163 acting on the projection 165 in a third position of disc 157 to permit the pawl to engage only one tooth of the ratchet wheel as and for the purpose hereinafter set forth. The cam disc 157 is secured by bolts 166 to an arm 167 which is secured to a rod 170 supported for axial sliding movement in a bearing portion 171 of a bracket 172 secured to the right hand arm 81 (Fig. 3) and also in a bushing 175 secured in a bearing portion 176 of the bracket.

Figures 9, 10, 11:
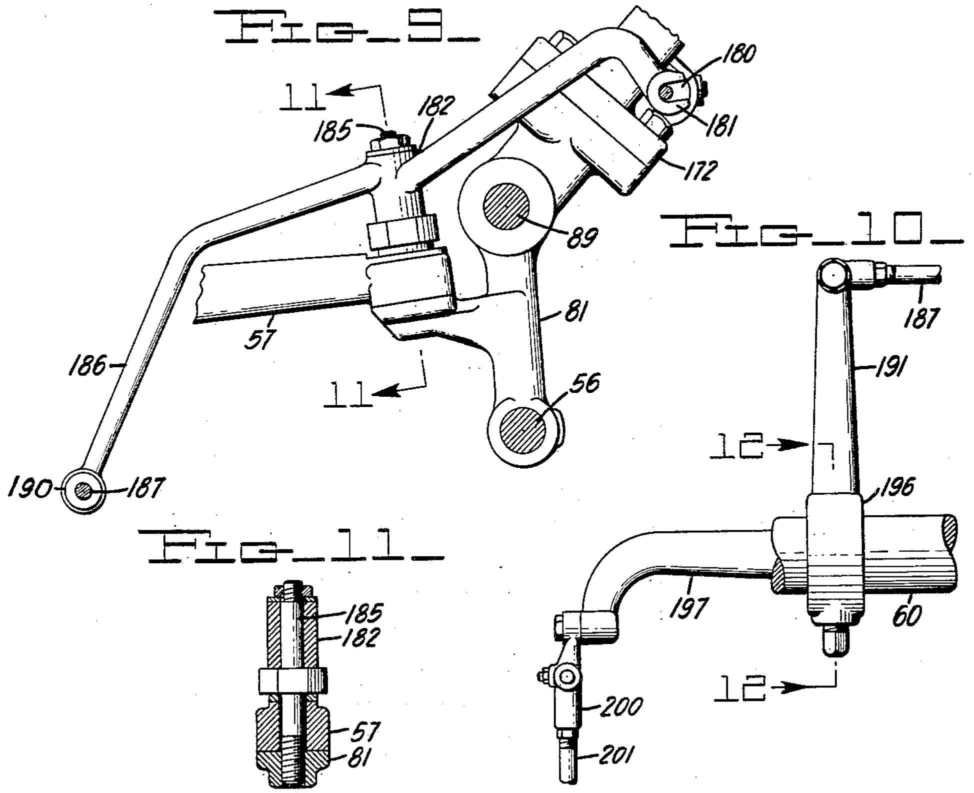
Fig. 9 is a detailed view partly in end elevation and partly in cross-section taken substantially along the line 9—9 of Fig. 3.
Fig 10 is a detailed elevational view on an enlarged scale taken in the direction of the arrows 10—10 on Fig. 2.
Fig. 11 is a cross-sectional view taken along the line 11—11 of Fig. 9.
Figures 12, 13:
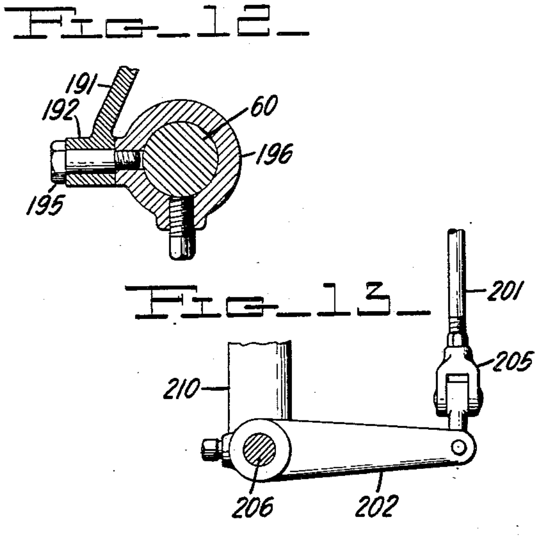
Fig. 12 is a cross-sectional view taken along the line 12—12 of Fig. 10.
Fig. 13 is a detailed view taken substantially along the line 13—13 of Fig. 2.

The rod 170 is normally biased toward the left from its position of Fig. 3 by a compression spring 177 surrounding the rod between the bearing portion 176 and the arm 167 to position the cam disc 157 so that recess 160 receives the projection 161 on the pawl 82. In this position of disc 157 it is axially spaced from projection 165 and pawl 102 is allowed to remain in active position to turn the spindle 80 clockwise (Figs. 4 and 5) and move the nuts 76 and 77 and the rods 52 and 53, respectively, toward each other as hereinbefore set forth, when either of the cams 151 and 152 operate the lever 142 as hereinafter set forth. When the pawl 102 is to be made inactive and the pawl 82 active to turn the spindle 80 in a counterclockwise direction (Fig. 4) the cam disc 157 is positioned to the right to engage the projection 165 on the pawl 102 and to disengage the projection 161 on pawl 82. In order to shift the cam disc 157 to the right, the rod 170 carries a collar 180 which is adapted to be engaged by a forked end 181 of a shifting lever 182. The lever 182 is pivotally mounted on a stud 185 carried in one of the arms 57 (Figs. 9 and 11) and has an arm 186 the free end of which surrounds a rod 187 between collars 190 secured to the rod (Fig. 3). The rod 187 is pivotally connected to one arm 191 of a lever 192 pivotally mounted on a stud 195 carried in a collar 196 fixed to the shaft 60 (Figs. 2, 10 and 12). A second arm 197 of the lever 192 is connected by a universal joint 200 to one end of a rod 201 having its other end connected to an arm 202 by a universal joint 205 (Fig. 13). The arm 202 is secured to one end of a shaft 206 which is pivotally mounted in bearing brackets 207 and 210 carried on the front and back beams 30 and 31, respectively, Fig. 2. The free end of a second arm 211 fixed to the other end of the shaft 206 engages a collar 212 on a rod 215 which is slidably mounted in brackets 214 secured to the front beam 30 (Fig. 1). The rod 215 is one of the usual control rods of the machine and is connected to and operated by one of a series of pattern levers 216 forming part of the conventional pattern device 66. The free end of the arm 211 is biased toward engagement with the collar 212 by a spring 217 which is connected between the arm and a collar 220 secured to the rod 215. The rod 215 is biased toward the right, as viewed in Fig. 1, by a compression spring 221 carried on the rod between one of the brackets 214 and a collar 222 secured to the rod.

In the instant arrangement, the narrowing cam 152 is shaped to have a low portion 225 of such depth that, as follower 150 passes through the low portion the lever 142 moves the active pawl 82 or 102 to turn the spindle 80 through a distance equal to two teeth of the ratchet wheel 85 or 87 to shift the loops engaged by the points 45 in the combs 47 a distance of two needles. This occurs during fashioning operations to narrow or widen inner selvages of the fabric blanks. The cam 152 is also provided with a second low portion 226 of lesser depth which acts through the follower and lever to turn the spindle 80 a distance of only one tooth of the ratchet wheels to idly position the combs a one needle distance after and in the same direction as the fashioning operation. The cam 151 is also shaped to have a low portion corresponding to the low portion 225 of cam 152 to turn the spindle 80 in either direction during knitting cycles of the machine to idly reposition the combs 47 between fashioning cycles and to reset the combs to starting position. Although the cam 151 is only shown with a single low portion it will be obvious that the cam may be provided with one or more additional low portions to increase the distance that the combs may be idly moved between fashioning cycles.

Figure 15:
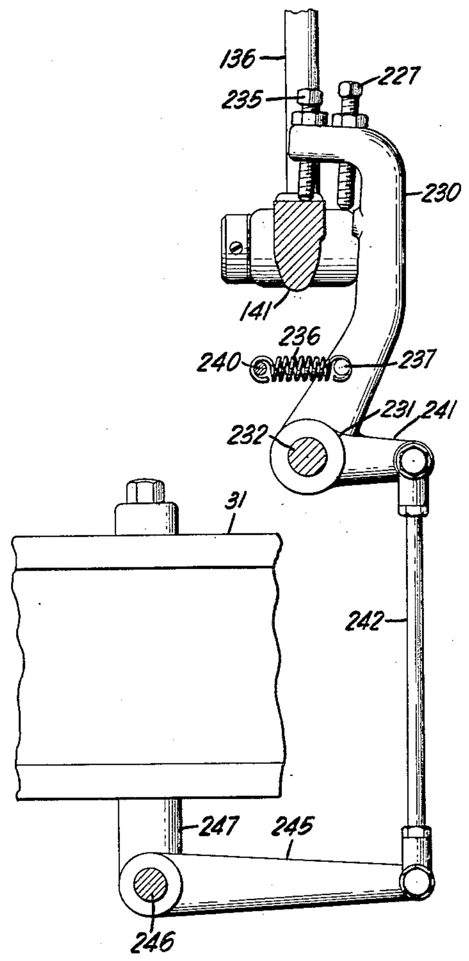
Fig. 15 is a view partly in cross-section and partly in elevation taken on the line 15—15 of Fig. 14 and shown enlarged relative to Fig. 14.

It is also desirable at times to prevent the turning movement of the pawls 82 and 102 or to limit the turning movement of the pawls to a distance equal to one tooth of the ratchet wheels during fashioning cycles of the cam 152 and idle positioning cycles of the cam 151. In order to prevent the movements of the pawls, the follower 150 is held in a position corresponding to the highest points of the cams 151 and 152 by a set screw 227 which is adapted to be positioned to overlie the arm 141 of the lever 142 (Figs. 14 and 15). The set screw 227 is carried in an arm 230 of a lever 231 pivotally mounted on a stud or pin 232 carried in the bracket 145. The arm 230 also carries a second set screw 235 which is adapted to be positioned to overlie the arm 141, as shown in Fig. 15, to permit the lever 142 to only partially follow the contours of the cams 151 and 152 and limit the turning of the ratchet wheels to the distance of one tooth. A spring 236 connected between a pin 237 on the lever 230 and a pin 240 on the bracket 145 normally biases the arm 230 counterclockwise, as viewed in Fig. 15, to position the set screw 227 above the arm 141. In order to turn the lever 231 clockwise on the pin 232 to either position the set screw 235 above the arm 141 or to remove both set screws from above the arm, the lever 231 is provided with a second arm 241 which is pivotally connected to one end of a link 242. The other end of the link 242 is pivotally connected to the free end of an arm 245 fixed to a shaft 246 adjacent one end thereof. The shaft 246 is pivotally supported in a bracket 247 fixed to the back beam 31 (Fig. 14) and a bracket 250 secured to the front beam 30 (Fig. 1). An arm 251 secured to the other end of the shaft has its free end biased by a spring 252 into engagement with a bracket 255 which is secured to a rod 256 supported for sliding movement in the brackets 214. The rod 256 is connected to and operated by one of the levers 216 of the pattern device and is biased toward the right by a spring 221 in the same manner as the rod 215.

As hereinbefore set forth the rod 170 and cam disc 157 normally is positioned to the left of its position of Fig. 6 to permit operation of the pawl 102 to turn the spindle 80 and to hold the pawl 82 inactive. When it is desired to reverse the direction of the spindle 80 a button on the chain 68 operates the lever 216 for the rod 215 to shift the rod toward the left which acts on the arm 211 and connections to turn the lever 182 on the stud 185 and shift the rod 170 and cam disc 157 toward the right to the position of Fig. 3. When the spindle 80 is to be turned by the active pawl during either a narrowing cycle to move the combs 47 to fashion the fabric blanks or during a knitting cycle to idly reposition the combs 47, a high or a low button on the chain 68 is moved beneath the lever 216 for the rod 256. The high button acts on the rod 256 to shift both set screws 227 and 235 from above the arm 141 to permit follower 150 to follow the low portions 225 of the cams 151 or 152 to actuate the lever 142 and active pawl to turn the spindle through a distance equal to two teeth of the ratchet wheels. The low button on the other hand acts on the rod 256 to rotate the lever 231 to position the set screw 235 above the arm 141 and the follower 150 is prevented from following to the full depth of the low portion 225 of the cams with the result that the active pawl is given a movement only sufficient to turn the spindle a distance equal to one tooth of the ratchet wheels.

With the foregoing arrangement the spindle 80 may be rotated in either direction to move the combs 47 and associated combs 54 to produce fashioning and lace forming operations of either one or two needles. The spindle is also operated to idly move the combs a one needle distance following a fashioning operation in either direction and in addition the spindle may be operated during knitting cycles to idly move the combs in one or two needle steps in either direction between fashioning operations to cause the rows of fashion marks to converge or diverge with respect to the selvages fashioned by the combs 47.

In order to accurately position and hold spindle 80 in each position to which it is turned by the pawls 82 and 102 the disc 86 is provided with V-shaped notches 259 having the same spacing as the teeth in the ratchet wheels 85 and 87. The notches 259 provide a seat for the V-shaped end of a detent member 260 which is journalled for axial sliding movement in the bracket 172. The detent member 260 carries a pin 261 interengaging a slot 262 in the bracket 172 (Fig. 8) to prevent it from turning in the bracket. The detent member is provided with a reduced portion 265 which is adapted to be engaged by a forked end 266 of a hand lever 267 pivotally mounted intermediate its ends in the bracket 172 (Fig. 3). A spring 270 connected between the forked end of the lever 267 and bracket 172 maintains the detent member 260 in resilient engagement with the notches 259 in disc 86.

At times it is desired to manually rotate the spindle 80 to reset the combs 47 particularly when the machine is idle. For this purpose there is provided a hand crank 271 which may be connected to turn a bevel gear 272 supported on a portion of the bracket 107 (Figs. 1 and 3). The bevel gear 272 is in meshing engagement with a bevel gear 275 fixed on the right end portion 89 of the spindle 80. During such manual rotation of the spindle 80 the pawl 82 is rotated to a fully disengaged or inactive position relative to the ratchet wheel 85 and the hand lever 267 manually manipulated to release the detent member 260 from the notches 259. In order to also disengage the pawl 102 from the teeth of the ratchet wheel 87, the pawl is provided with a pin 276 projecting into the path of and for engagement with a cammed end portion 277 of an arm 280 pivotally supported on the bushing 175 (Figs. 4 and 6). A spring 278 connected between the arm 280 and a fixed part of the machine normally biases the arm counterclockwise to a position determined by engagement of a set screw 279, carried in the arm, with the hub portion of the lever 106 and in which posiiton the portion 277 of the arm will not interfere with the operation of the pawl 102. The arm 280 has a projecting portion 281 which is held in resilient engagement by a spring 282 with a set screw 285 adjustably carried in one free end of a lever 283 pivotally mounted intermediate its ends in a portion of the bracket 172 (Figs. 3 and 4). The other end of the lever 283 is adapted to be engaged by the top of the detent member 260. As the hand lever 267 is manually manipulated to release the detent member 260 as hereinbefore set forth, the detent member engages and turns the lever 283 clockwise, as viewed in Fig. 3, which in turn rotates the arm 280 clockwise, as viewed in Figs. 4 and 5, to disengage the pawl 102 from the teeth of the ratchet wheel 87.

In order to prevent overtravel of the nuts 76 and 77 and the combs 47 associated therewith in the direction toward each other by the pawl 102 during movements of the pawl to reset the combs to their closest or starting position, shown in Fig. 1, the cam disc 157 is adapted to be moved to disengage the pawl from the ratchet wheel 87 independently of the movements of the cam disc by the lever 182. For this purpose the rod 170 extends toward the left, as viewed in Fig. 1, and carries a collar 284 for engagement with a free end portion of one arm 287 of a lever 290 mounted for rotative movement on a stud 289 fixed in the nut 77 (Figs. 16, 17 and 18). A spring 292 connected between the arm 287 and a pin 295 in the nut 77 biases the lever clockwise to engage a finger portion 296 of the lever with the pin. A second arm 297 of the lever 290 carries adjustable studs 299 and 300 which are adapted to be engaged by an adjustable stud 301 carried in a collar 302 secured to the spindle 80 at a point intermediate reversely threaded portions of the spindle (Figs. 17 and 18).

With this arrangement, when the nuts 76 and 77 and associated combs 47 are moved toward each other through the action of the pawl 102 during fashioning or resetting operations, as the spindle is given a final movement equal to two teeth of the ratchet wheel 87 to bring the nuts and combs to the position of Fig. 1, the collar 302 is rotated to engage the stud 301 with the stud 300 in the lever 290. This engagement of the studs rotates the levers 290 counterclockwise to engage the collar 284 and shift the rod 170 and cam disc 157 to the right to the position of Figs. 1 and 3 to fully inactivate the pawl 102 and release the pawl 82. When it occurs that a two tooth movement of the pawl 102 turns the spindle 80 to position the nuts and combs to a point spaced from each other only a distance equal to a one tooth movement of the ratchet wheel 87, the stud 301 in the collar 302 will engage the stud 299 in the lever 290. Engagement of the studs 301 and 299 turns the lever 290 counterclockwise to shift the rod 170 and cam disc 157 to position the recess 163 to receive the projection 165 of the pawl 102. At this time the cam disc 157 is still in position to inactivate the pawl 82 as projection 161 remains partially within recess 160. During the final resetting movement of the pawl 102 to turn the spindle, the pawl is only permitted to engage a single tooth of the ratchet wheel 87 due to the camming action of the wall of recess 163. This completes the resetting movement of the combs and moves the cam disc to fully inactivate the pawl 102.

It will be obvious that the foregoing means provides an effective safety for preventing accidental overtravel of the combs 47 toward each other during fashioning and resetting operations of the spindle 80. It will also be obvious that although the pawl for turning the spindle to move the nuts 76 and 77 and combs 47 toward each other is inactivated, the pawl for turning the spindle to move the combs away from each other is permitted to operate. This is particularly desirable where the combs 47 are positioned as in Fig. 1, so that the pawl 82 may operate the spindle 80 to move the combs away from each other without prior manual adjustments to the machine.

Figure 21:
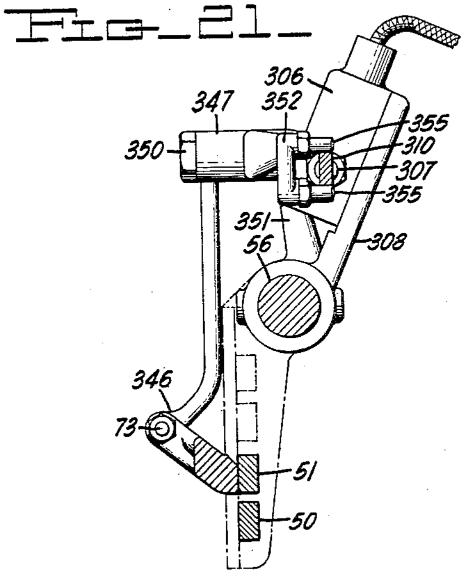
Fig. 21 is a cross-sectional view taken along the line 21—21 of Fig. 20, parts being omitted.
Figure 23:
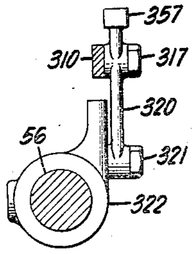
Fig. 23 is a fragmentary cross-sectional view on an enlarged scale taken substantially along the line 23—23 of Fig. 19.
Figure 22:
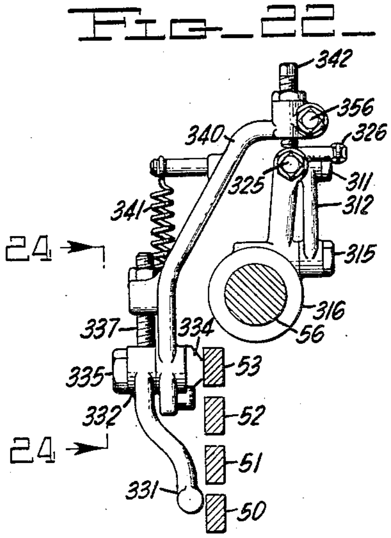
Fig. 22 is a cross-sectional view on an enlarged scale taken substantially along the line 22—22 of Fig. 19.
Figure 25:
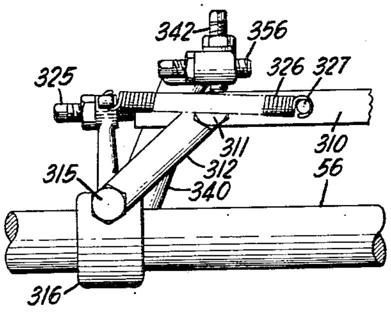
Fig. 25 is a fragmentary elevational view as seen from the right of Fig. 22.

As hereinbefore set forth the outer combs 46 are moved independently of the inner combs 47 so that a pair of combs 46, 47 acting to fashion opposite selvage edges for instance in the left hand part of the fabric blanks for example at sleeve and neck openings of a sweater, may be simultaneously operated in the same direction or toward and away from each other. In order to prevent accidental overtravel of the combs 47 in the direction toward each other, the means as above set forth, is provided. Additionally, there is provided a safety means for limiting the movement of the combs 46 toward and away from each other and the movement of the combs 47 away from each other. The safety means includes a switch 306 (Figs. 20 and 21) which is connected into the electrical circuit for the motor (not shown) for operating the machine and is supported on a bracket 308 secured to the shaft 56. A button 307 of the switch is adapted to be actuated to open the circuit to the motor by an actuator member or ram 310 which is supported in horizontal position for arcuate movement downwardly and toward the switch to depress the button. For so supporting the ram 310 the right end of the ram is pivotally connected by a stud 311 to the free end of a link 312 which is pivotally supported on a stud 315 carried in a bracket 316 secured to the shaft 56 (Figs. 22 and 25). At a point intermediate its ends the ram 310 is pivotally connected by a stud 317 to the free end of a link 320 which is pivotally mounted on a stud 321 carried in a bracket 322 also secured to the shaft 56 (Figs. 20 and 23). As downward pressure is applied to the ram 310, as hereinafter set forth, the links 312 and 320 are simultaneously pivoted about the studs 315 and 321, respectively, to move the ram through a small arc during which movement an end of the ram engages and depresses the button 307 of the switch 306. The ram 310 is normally held in inactive position relative to the switch 306 against a stop screw 325, adjustably carried in the bracket 316, by means of a spring 326 connected between a pin 327 in the ram and the bracket 316 (Fig. 25).

Figure 24:
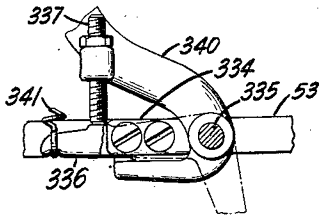
Fig. 24 is a detailed view on an enlarged scale of a portion of the mechanism as viewed in the direction of and within the arrows 24—24 on Fig. 22, parts being broken away and shown in dot-and-dash outline in order to clearly show other parts in the background.

In order to operate the ram 310 to actuate the switch button 307 when the nut 67 and associated rod 51 and combs 46 have reached their predetermined limit of movement toward the right, as viewed in Fig. 20, the rod 51 is provided with an adjustable stop screw 330 which is adapted to be moved by the rod into engagement with an arm 331 of a bell crank 332. The bell crank 332 is pivotally carried on a stud 335 carried in a block 334 (Figs. 22 and 24) which is secured to the rod 53. The bell crank has a second arm 336 engageable with a stop screw 337 adjustably carried in a lever 340 also pivotally mounted on the stud 335. A spring 341 connected between the arm 336 and the lever 340 (Fig. 20) normally maintains the stop screw 337 and arm in engagement. At its upper end the lever 340 adjustably carries a screw 342 for engagement with the top surface of the ram 310. When the stop screw 330 engages the arm 331 to turn the bell crank 332 counterclockwise, the lever 340 is also turned in the same direction by the spring 341 to operate the ram 310 as above set forth to stop the machine.

The ram 310 is also operated to actuate the switch 306 when the nut 67 and rod 51 have reached their limit of movement toward the left, as viewed in Figs. 19 and 20. For this purpose the left bolt 73 carried on the rod 51 is engageable with a bolt 345 adjustably carried in the free end of one arm 346 of a bell crank 347 mounted for pivotal movement on a stud 350 fixed in a bracket 351 secured to the shaft 56. A second arm 352 of the bell crank 347 carries a pair of studs 355 spaced to engage the upper and lower surfaces of the ram 310 (Fig. 21). Engagement of the bolt 73 with the bolt 345 turns the bell crank 347 clockwise, as viewed in Fig. 20, to move the ram 310 to engage the button 307 to open the switch 306 to stop the machine, as hereinbefore set forth.

The ram 310 is also operated when the nut 77 and rod 53 have reached the limit of movement toward the left (Figs. 1 and 19) to actuate the switch 306 to stop the machine. In order to operate the ram for this purpose the lever 340 adjustably carries a screw 356 which is adapted to engage a finger 357 projecting from the link 320. As the rod 53 is moved toward the left, the screw 356 engages the finger 357 to operate the ram 310 to open the switch 306.

It will be understood that the improvements specifically shown and described by which the above described results are obtained, can be changed and modified in various ways without departing from the invention disclosed and hereinafter claimed.

I claim:

1. In a knitting machine having means for knitting and fashioning selvaged fabric blanks, said fashioning means comprising point combs for shaping selvages of said fabric blanks, and means for operating said point combs including a reversely threaded spindle, means for turning said spindle in one direction, means for turning said spindle in a direction opposite to said one direction, a member mounted on and movable axially of said spindle for controlling the operation of said turning means, means for moving said member between positions in which the member permits operation of one of said turning means and inactivates the other, and means for operating said moving means for moving said member between said positions.

2. In a knitting machine having means for knitting and fashioning selvaged fabric blanks, said fashioning means including inner point combs, a threaded spindle for operating said combs, means for turning said spindle in one direction, means for turning said spindle in a direction opposite to said one direction, a member mounted on and movable axially of said spindle for controlling the operation of said turning means, means for moving said member on said spindle between positions in which the member permits operation of one of said turning means and inactivates the other, means for controlling the operation of said moving means, means for actuating said turning means, a member for normally holding said actuating means inactive and means for operating said member to release said actuating means.

3. In a knitting machine having knitting means, fashioning means and means for operating said machine through knitting and fashioning cycles, said fashioning means including inner point combs, a threaded spindle for operating said combs, means for turning said spindle in one direction, means for turning said spindle in a direction opposite to said one direction, a member mounted on and movable axially of said spindle for controlling the operation of said turning means, means for moving said member between positions in which the member permits operation of one of said turning means and inactivates the other, means for controlling the operation of said moving means, means for actuating said turning means in both knitting and fashioning cycles, a member for normally holding said actuating means inactive, and means for operating said last mentioned member to release said actuating means.

4. In a knitting machine having means for knitting and fashioning selvaged fabric blanks, said fashioning means including inner point combs, a threaded spindle for operating said combs, means for turning said spindle in one direction, means for turning said spindle in a direction opposite to said one direction, a member mounted on and movable axially of said spindle to control the operation of said turning means, means for moving said member between positions in which the member permits operation of one of said turning means and inactivates the other, means for controlling said moving means, means for actuating said turning means, a member for normally holding said actuating means inactive, and means for operating said member to release said actuating means for movements of different extent.

5. In a knitting machine having means for knitting and fashioning selvaged fabric blanks, said fashioning means comprising outer point combs for shaping outer selvages of said fabric blanks, means for operating said outer point combs, inner point combs for shaping inner selvages of said fabric blanks, and means for operating said inner point combs including a reversely threaded spindle, means for turning said spindle in one direction, means for turning said spindle in a direction opposite to said one direction, a member mounted on and movable axially of said spindle for controlling the operation of said turning means, means for moving said member between positions in which the member permits operation of one of said turning means and inactivates the other, and pattern controlled means for operating said moving means to move said member between said positions.

6. In a knitting machine having means for knitting and fashioning selvaged fabric blanks, said fashioning means comprising outer point combs for shaping outer selvages of said fabric blanks, means for operating said outer point combs, inner point combs for shaping inner selvages of said fabric blanks, and means for operating said inner point combs including a reversely threaded spindle, means for turning said spindle in one direction, means for turning said spindle in a direction opposite to said one direction, a member mounted on and movable axially of said spindle for controlling the operation of said turning means, means for moving said member between positions in which the member permits operation of one of said turning means and inactivates the other, pattern controlled means for operating said moving means to move said member between said positions, means for operating said turning means, and control means for said last mentioned operating means.

7. In a knitting machine having knitting means, fashioning means, and means for operating said machine through knitting and fashioning cycles to form selvaged fabric blanks, said fashioning means including point combs for shaping selvages of said blanks and means for operating said point combs in directions toward and away from each other including a reversely threaded spindle, means for turning said spindle in one direction to move said combs in one direction, means for turning said spindle in a direction opposite to said one direction to move said combs in the opposite direction, means for operating said turning means during fashioning and knitting cycles, a member on said spindle for controlling the operation of said turning means, pattern controlled means for moving said member axially of said spindle between said turning means to permit one of said turning means to operate while inactivating the other, and spindle controlled means for moving said member axially of said spindle to inactivate the spindle turning means for turning said spindle in one direction.

8. In a knitting machine having means for knitting and fashioning selvaged fabric blanks, said fashioning means including inner point combs, a reversely threaded spindle for operating said point combs, pawl and ratchet means for turning said spindle in one direction, pawl and ratchet means for turning said spindle in a direction opposite to said one direction, a member mounted on and movable axially along said spindle to control the ratchet turning movements of said pawls, pattern controlled means for moving said member between positions to permit operation of one of said pawls to turn said spindle in one direction and to inactivate the other of said pawls, said pattern controlled means including means to normally position said member to inactivate one of said pawls, and means actuated by said spindle for operating said member to inactivate one of said pawls.

9. In a knitting machine having means for knitting and fashioning selvaged fabric blanks, said fashioning means comprising outer point combs for shaping outer selvages of said blanks, means for operating said outer point combs, inner point combs for shaping inner selvages of said blanks and means for operating said inner point combs including a reversely threaded spindle, means for turning said spindle in one direction, means for turning said spindle in a direction opposite to said one direction, a cam disc on said spindle operable to control said turning means, means for moving said cam disc axially along said spindle between said turning means to permit one of said turning means to operate and to inactivate the other, pattern means for selectively controlling the operation of said moving means for said cam disc, and means operated by the turning movement of said spindle in one direction to inactivate the turning means for turning said spindle in said direction.

10. In a knitting machine having means for knitting and fashioning selvaged fabric blanks, said fashioning means comprising outer point combs for shaping outer selvages of said blanks, means for operating said outer point combs, inner point combs for shaping inner selvages of said blanks and means for operating said inner point combs including a reversely threaded spindle, means for turning said spindle in one direction to move said inner point combs toward each other, means for turning said spindle in a direction opposite to said first mentioned direction to move said inner point combs away from each other, a cam disc on said spindle, pattern controlled means for selectively moving said cam disc axially along said spindle between said turning means to permit operation of one of said turning means and inactivate the other of said turning means, and means operated by said spindle to move said cam disc to inactivate the means for turning said spindle in one direction when the spindle has reached its limit of turning movement in said direction.

11. In a knitting machine having means for knitting and fashioning selvaged fabric blanks, said fashioning means comprising inner combs having points for engaging and transferring selvage loops to shape inner selvages of said blanks, combs associated with said inner combs having points for engaging and transferring loops of said fabric to form lace openings adjacent to the loops of the inner fashioned selvages, means for operating the inner combs and combs associated therewith including a reversely threaded spindle, means for turning said spindle in one direction, means for turning said spindle in a direction opposite to said first direction, a cam disc mounted on and movable axially of said spindle to control the operation of said turning means, means for moving said cam disc between positions in which the cam disc permits operation of one of said turning means and inactivates the other, and pattern controlled means for operating said moving means to move said cam disc between said positions.

12. In a knitting machine having knitting means fashioning means and means for operating said machine through knitting and fashioning cycles to form selvaged fabric blanks, said fashioning means including outer point combs for shaping outer selvages of said blanks, inner point combs for shaping inner selvages of said blanks, a threaded spindle for operating said outer combs, means for reversely turning said spindle to move said outer combs in opposite directions, a reversely threaded spindle for operating said inner point combs, means for turning said reversely threaded spindle in opposite directions, means acting on said turning means for said reversely threaded spindle to limit its turning movement in one direction, means for stopping the operation of said machine, means operated by said reversely threaded spindle to operate said stopping means to limit the turning movement of said reversely threaded spindle in the direction opposite to said one direction, and means associated with said spindle for the outer point combs for operating said stopping means to limit the turning movement of said last mentioned spindle in both directions.

13. In a knitting machine having knitting and fashioning means and means for operating said machine through knitting and fashioning cycles to form selvaged fabric blanks, said fashioning means including outer point combs, means for moving said outer combs in opposite directions, inner point combs, means for moving said inner point combs in opposite directions, means for stopping the operation of said machine, an actuator member, means for supporting said actuator member for movement between an inactive position and an active position in which said actuator member operates said stopping means, means for normally holding said actuator member in inactive position, means operated by the movement of the inner combs in one direction to move said actuator member to active position, and means operated by the movement of the outer combs in both directions to move said actuator member to active positions.

14. In a knitting machine having knitting and fashioning means and means for operating said machine through knitting and fashioning cycles to form selvaged fabric blanks, said fashioning means including outer point combs, means for moving said outer point combs in opposite directions, inner point combs, means for moving said inner point combs in opposite directions, means for stopping the operation of said machine, an actuator member, means for pivotally supporting said actuator member for movement between an inactive position and an active position in which said actuator member operates said stopping means, a stop to determine the inactive position of said actuator member, resilient means for normally maintaining said actuator member in engagement with said stop, means operated by the movement of the inner combs in one direction to move said actuator member to active position, and means operated by the movement of the outer combs in both directions to move said actuator member to active position.

References Cited in the file of this patent

UNITED STATES PATENTS

| | | |
|---|---|---|
| 2,024,519 | Gee | Dec. 17, 1935 |
| 2,109,140 | Richter et al. | Feb. 22, 1938 |